(12) United States Patent
Shindo et al.

(10) Patent No.: US 7,096,567 B2
(45) Date of Patent: Aug. 29, 2006

(54) METHOD FOR MEASURING AMOUNT OF GRINDING IN MAGNETIC HEAD PRODUCING PROCESS

(75) Inventors: Hiroshi Shindo, Tokyo (JP); Akio Ogawa, Tokyo (JP); Kazushige Tohta, Tokyo (JP)

(73) Assignee: TDK Corporation, Tokyo (JP)

( * ) Notice: Subject to any disclaimer, the term of this patent is extended or adjusted under 35 U.S.C. 154(b) by 170 days.

(21) Appl. No.: 10/938,535

(22) Filed: Sep. 13, 2004

(65) Prior Publication Data

US 2005/0028354 A1  Feb. 10, 2005

Related U.S. Application Data

(62) Division of application No. 10/311,214, filed as application No. PCT/JP01/05123 on Jun. 15, 2001.

(30) Foreign Application Priority Data

Jun. 16, 2000 (JP) ............................. 2000-181360
Jun. 14, 2001 (JP) ............................. 2001-179866

(51) Int. Cl.
*G11B 5/127* (2006.01)
*H04R 31/00* (2006.01)

(52) U.S. Cl. ............... 29/603.12; 29/603.09; 29/603.1; 29/603.16; 360/235.7; 360/235.8; 360/236.3; 360/236.5; 360/236.6; 360/237; 414/222.12; 414/226; 451/5; 451/41

(58) Field of Classification Search ............ 29/603.07, 29/603.09, 603.1, 603.12, 603.16; 451/5, 451/41; 360/235.7, 235.8, 236.3, 236.5, 360/236.6, 237; 414/222.12, 226

See application file for complete search history.

(56) References Cited

U.S. PATENT DOCUMENTS

| 4,689,877 A | 9/1987 | Church |
| 4,914,868 A | 4/1990 | Church et al. |
| 5,065,483 A | 11/1991 | Zammit |
| 5,117,589 A * | 6/1992 | Bischoff et al. ............ 451/405 |
| 5,210,667 A | 5/1993 | Zammit |
| 5,620,356 A | 4/1997 | Lackey et al. |
| 5,993,290 A | 11/1999 | Yoshihara et al. |
| 6,017,264 A * | 1/2000 | Strom ......................... 451/41 |
| 6,374,479 B1 * | 4/2002 | Sasaki et al. ............ 29/603.16 |

FOREIGN PATENT DOCUMENTS

| JP | 60-76011 | 4/1985 |
| JP | 2-95572 | 4/1990 |
| JP | 5-44085 | 7/1993 |

(Continued)

*Primary Examiner*—Paul D. Kim
(74) *Attorney, Agent, or Firm*—Oblon, Spivak, McClelland, Maier & Neustadt, P.C.

(57) ABSTRACT

The present invention is an object to provide an apparatus or a method making it possible to easily effect connection between additional electrodes, etc. and lead electrodes when performing a processing for achieving a predetermined throat height value or crown processing or the like and making it possible to measure the requisite lapping amount. For achieving the object, a flexible electrode extension sheet is used which consists of a portion for retaining a ceramic bar in which element portions are formed and a portion where there are formed wirings respectively in correspondence with the elements and adapted to be connected to these elements, in which these wirings, which can be easily connected to an external measurement system, are electrically connected to the elements, whereby the lapping amount is easily obtained from the characteristic amount of the elements in the lapping process.

1 Claim, 14 Drawing Sheets

FOREIGN PATENT DOCUMENTS

| | | |
|---|---|---|
| JP | 7-112672 | 12/1995 |
| JP | 07326034 A * | 12/1995 |
| JP | 8-167115 | 6/1996 |
| JP | 10-146758 | 8/1998 |
| JP | 10-283613 | 10/1998 |
| JP | 11-16124 | 1/1999 |
| JP | 2924683 | 7/1999 |
| JP | 2000-67414 | 3/2000 |

* cited by examiner

METHOD FOR MEASURING AMOUNT OF GRINDING IN MAGNETIC HEAD PRODUCING PROCESS

CROSS-REFERENCE TO RELATED APPLICATIONS

This application is a division of application Ser. No. 10/311,214, filed on Dec. 16, 2002, now pending which is a national stage application of International Application PCT/JP01/05123, filed on Jun. 15, 2001, which claims priority to JP 2001-179866, filed on Jun. 14, 2001, which claims priority to JP 2000-181360, filed on Jun. 16, 2000, the contents of each of which are incorporated herein by reference.

TECHNICAL FIELD

The present invention relates to a magnetic head lapping apparatus and a lapping method for lapping an object to be lapped in which a plurality of magneto-electric conversion elements or the like constituting magnetic heads are arranged and, in particular, to an apparatus and a method for measuring an amount by which the object to be lapped (ceramic bar) is lapped.

BACKGROUND ART

A thin film magnetic head for use in a magnetic disc apparatus or the like is formed of a component obtained by processing a bar-shaped ceramic (hereinafter referred to as a "ceramic bar") on the surface of which are formed a large number of element portions consisting of magnetic thin films or the like forming induction type magnetic conversion elements that are electro-magnetic conversion elements, magnetic resistance elements (hereinafter referred to as "MR elements") that are magneto-electric conversion elements, etc. A large number of such element portions are first formed simultaneously on a wafer-shaped ceramic substrate, which is cut in one direction into a bar shape to thereby obtain the above-mentioned ceramic bar.

A large number of such element portions are simultaneously formed on a wafer-shaped ceramic substrate by using a thin film forming and processing technique, such as a semiconductor manufacturing technique. In this process, film formation, photo resist application, exposure of wiring configuration, etc., removal of photo resist in the exposure portion, etc. are performed on the respective thin films for magnetic resistance measurement, magnetic poles, coils, insulation, etc. Thereafter, a protective film is formed in the uppermost portion to complete the formation of the element portions.

Further, on the ceramic bar on which a plurality of element portions have been formed, a processing, such as lapping, is performed so as to adjust the throat height, MR height, etc. of each element portion to an appropriate value. Generally speaking, to stabilize the output characteristics of a magnetic head in a magnetic disc apparatus, it is necessary to maintain an extremely small fixed distance between the magnetic pole portion of the magnetic head and the surface of the recording medium, and the throat height or MR height is an important parameter in determining this distance.

After a predetermined throat height, etc. have been obtained in each element portion, further performed on this lapped surface are a rounding processing for forming the lapping surface into a curved surface having a predetermined radius of curvature, a processing for forming a groove for the lapping surface, a processing for lapping an end portion to form a surface inclined with respect to the lapping surface, etc. In the subsequent process, the ceramic bar is individually separated into the respective element portions, each constituting a component of a magnetic head for a magnetic disc apparatus. When the magnetic head is used in a magnetic disc apparatus, and performs the recording and reproduction of a magnetic signal on and from a magnetic disc, this component constitutes a slider whose ceramic portion flies over the magnetic disc by the air pressure due to the rotation of the disc, and the element portion constitutes a head core which performs the recording and/or reproduction of the magnetic signal of the disc.

The term "throat height" means the length (height) of the magnetic pole forward end portion of such a head core for performing the recording and reproduction of the magnetic signal, where two magnetic poles are opposed to each other with a minute gap therebetween. The term "MR height" means the distance (height) between the end portion of the MR element opposed to the medium and the end portion thereof on the other side. To enable a signal to be appropriately recorded and reproduced, it is necessary for the values of the throat height and the MR height to be predetermined ones. To obtain the predetermined values, high accuracy in lapping is required.

Further, as stated above, due to the pressure of the air flow generated as a result of the high speed rotation of the disc, the slider flies over the disc surface, while being separated therefrom by a minute distance. To accurately perform the writing of information on the disc and the reading of information from the disc by the element portion, it is necessary for the flying height of the flying slider and the attitude of the slider at the time of flying to be always stable. By performing the above-mentioned rounding processing, etc. on the slider, it is possible for the slider to fly in a stable manner.

However, generally speaking, due to the stress, etc. generated as a result of the cutting from the ceramic substrate or the formation of the element portions, the ceramic bar involves distortion, bending, etc., so that it is difficult to achieve such a high processing accuracy as mentioned above solely by securing the ceramic bar and performing lapping thereon. In view of this, instead of an ordinary lapping apparatus, there has been proposed an apparatus which makes it possible to lap a magnetic head while in the form of a ceramic bar with high accuracy as disclosed, for example, in U.S. Pat. No. 5,620,356. The applicant of the present application has also proposed a number of such apparatuses and methods (Japanese Patent Application No. 11-162799, etc.). A method of processing a ceramic bar to obtain a predetermined throat height, etc. will be described. First, the surface of the ceramic bar on the opposite side of the surface to be lapped is glued to a jig by an adhesive or the like, and the surface of the ceramic bar to be lapped is pressed against the lapping surface of a lapping table through the intermdiation of the jig to thereby lap the surface to be lapped. By receiving a load, etc. from outside, the portion of this jig holding the ceramic bar undergoes the deformation, causing the ceramic bar to be deformed at the same time. Due to this arrangement, it is possible to correct the bending, etc. of the ceramic bar itself.

It is also possible to perform the above-mentioned rounding processing, etc. by using the method or the apparatus used in the method. Actually, however, due to the construction of the apparatus, it is difficult to obtain a smoothly rounded configuration, so that, generally, the rounding processing, etc. are performed by using an apparatus different from such apparatuses. Of the rounded configurations, a configuration in which the central portion of a lapped surface protrudes, or a configuration in which the lapped surface constitutes a part of a spherical surface, is referred to, in particular, as a crown configuration, and the processing for obtaining a crown configuration is called a crown processing. The applicant of the present application has proposed in, for example, Japanese Patent Application No. 11-302305, a lapping apparatus and a lapping method for performing a crown processing on the sliders while in the form of a ceramic bar.

The method for performing the crown processing on a ceramic bar disclosed by the present applicant will be described. The lapping surface of a lapping table formed of tin or the like used for the lapping of a ceramic bar is formed as a substantially concave conical shape constituting a part of a sphere having a predetermined radius. During the lapping, the ceramic bar is held by a horizontal jig extending in the longitudinal direction of the ceramic bar. Specifically, the surface of the ceramic bar on the opposite side of the surface to be lapped is attracted by an elastic member such as a rubber plate glued to one end surface of the horizontal jig by an adhesive, whereby the ceramic bar is held by the end surface of the jig.

By applying a load to the central portion of the jig so as to press the ceramic bar against the lapping surface, the entire surface to be lapped of the ceramic bar is lapped, forming the surface to be lapped into a crown-shaped configuration. At the same time, an appropriate load is applied to either end of the ceramic bar, whereby the longitudinal variation in the crown configuration formed on the ceramic bar is mitigated. Further, through an electrode or the like formed on the jig, the MR value of the MR element formed on the ceramic bar is measured during the lapping, and the load for pressing the ceramic bar against the lapping surface is controlled on the basis of the measurement result, whereby the lapping amount at the time of crown processing is controlled.

DISCLOSURE OF THE INVENTION

As the recording density of a magnetic recording medium increases, the permissible error range in the lapping process in which the throat height or the like is set to a predetermined value is becoming smaller than ever. In most cases, as compared with the lapping amount in the process for obtaining a predetermined throat height, the lapping amount at the time of crown processing is smaller, and even after the crown processing, substantially no great change is made in the throat height value. However, the permissible error in the processing of throat height or the like is becoming smaller year after year, and when, as at present, a lapping accuracy, for example, of ±0.01 µm or less is required for the ceramic bar, the crown processing must also be performed with high accuracy.

Further, elements actually formed on a ceramic bar also involve formation position errors generated in the element forming process. For example, in some cases, when exposing photo resist, the exposure processing is not performed at one time on the entire upper surface on the wafer. Instead, the wafer upper face is divided into a plurality of portions, the exposure processing being individually performed on each portion. As is generally known, when performing registration at the time of exposure by an exposure device, an error of 0.01 to 0.05 µm is involved.

Also in the case of elements formed on a single ceramic bar, the exposure processing is performed after longitudinally dividing the ceramic bar into a plurality of portions. This exposure processing involves a positional deviation of the elements. In some cases, depending on the direction of deviation, the deviation amount greatly exceeds the above requisite accuracy. Thus, apart from the correction of the bending of the ceramic bar, it is also necessary to perform the correction of this positional deviation.

Further, in the above element forming process, processings, such as film formation, exposure, and etching, are performed on a plurality of thin films, and an error in the thickness direction of the thin film and errors in the width direction and length direction of the wiring are generated in each process. While these errors are also generated in the region where exposure is performed at one time, these errors are all superimposed one upon the other, and detected as an inter-element positional error in the lapping direction and as a difference in the requisite lapping amount for each element at the time of the adjustment of the throat height or the like.

In view of the above problems, the present applicant has disclosed in Japanese Patent Application No. 12-44269 an apparatus and a method which make it possible to impart a complicated bending deformation or the like to a ceramic bar according to an inter-element positional deviation generated as a result of an exposure processing or the like to thereby adjust the lapping amount of the ceramic bar, making it possible to make the non-lapped portion or amount in each element uniform. However, in the above-mentioned apparatus and method, it is necessary to use a jig to which the ceramic bar is attached. Further, it is necessary to perform the process of attaching the ceramic bar to the jig and the process of detaching the ceramic bar from the jig after the completion of the lapping, resulting in an increase in the cost required for obtaining an appropriate throat height.

Further, when adjusting the throat height, the requisite lapping amount for each element is measured as needed, and, based on the measurement result, the bending deformation of the ceramic bar is adjusted. Specifically, an additional electrode for measuring the requisite lapping amount for each element is provided in the vicinity of each element, and this additional electrode is connected to an external measurement system apparatus through the jig, obtaining the requisite lapping amount by obtaining the reduction amount in the resistance value of the additional electrode as a result of lapping. In this case, it is necessary to connect the additional electrodes to lead electrodes provided on the jig. As the number of additional electrodes increases, the structure of the jig, and the connecting process become complicated, resulting in a further increase in cost.

In the case of the ceramic bar in which the throat height is adjusted to a predetermined value by the apparatus and method disclosed in Japanese Patent Application No. 2000-44269, there is the possibility that portions where the lapping amount is large locally exist. Thus, when further performing the crown processing on such a ceramic bar, it is necessary, also at the time of crown processing, to impart to the ceramic bar a deformation which is the same as or approximate to that imparted to the ceramic bar at the time of throat height adjustment.

Further, when, as the requisite processing accuracy becomes higher, the ceramic bar is deformed for each element also at the time of crown processing, it is necessary to adjust the lapping amount for each element. This can be coped with to some degree by using the above-mentioned apparatus, method, etc. disclosed by the present applicant to measure the requisite lapping amount from the MR element provided in each element and adjust the balance in the pressure with which the ceramic bar is pressed against the lapping surface. However, the technique using the above-mentioned apparatus, etc. is not different from the case in which the throat height is set to a predetermined value in that a jig is used, also leading to an increase in cost.

The present invention has been made in view of the above requirements. It is an object of the present invention to provide an apparatus or a method which, when performing a processing for adjusting a throat height to a predetermined value, a crown processing, etc., makes it possible to easily connect additional electrodes, etc. to lead electrodes to thereby make it possible to measure the requisite lapping amount. Further, it is an object of the present invention to provide an apparatus or a method which enables the lead electrodes to be easily connected to the additional electrodes or the like without the intermediation of a jig as in the prior art.

To achieve the above objects, in accordance with the present invention, there is provided an electrode extension sheet for use in a lapping apparatus which performs lapping on an object to be lapped which is elongated in one direction, in which a plurality of elements consisting of at least one of electro-magnetic conversion elements and magneto-electric conversion elements are formed in the length direction, or in which the plurality of elements and additional electrodes whose characteristics vary according to the lapping amount are formed in the length direction, by applying a load to the object to be lapped according to the positions where the elements are formed and imparting a minute deformation to the object to be lapped, wherein the electrode extension sheet is a flexible electrode extension sheet, and comprising: a portion holding the object to be lapped, and a portion having wirings which respectively correspond to the elements and whose end portions extend to the vicinity of the portion holding the object to be lapped.

Further, to achieve the above objects, slits may be formed in the electrode extension sheet at positions corresponding to the intervals between the elements, and the object to be lapped may be held by an adhesive, and further, the connection between the wiring end portions and the elements or the additional electrodes may be effected by gold balls.

Further, to achieve the above objects, there is provided, in accordance with the present invention, a lapping method for performing lapping on an object to be lapped which is elongated in one direction, in which a plurality of elements consisting of at least one of electro-magnetic conversion elements and magneto-electric conversion elements are formed in the length direction, or in which a plurality of elements and additional electrodes whose characteristics vary according to the lapping amount are formed in the length direction, comprising steps of providing first bump electrodes for mounting and second bump electrodes for lapping amount measurement for the elements; providing third bump electrodes for lapping amount measurement for the additional electrodes; electrically connecting at least one of the second and third bump electrodes to wirings formed on a flexible sheet; measuring a signal regarding the lapping amount obtained from at least one of the second and third bump electrodes through the wirings; calculating the lapping amount based on the measurement result; and the lapping the object to be lapped in accordance with the lapping amount calculated.

BEST MODE FOR CARRYING OUT THE INVENTION

Figure 1:
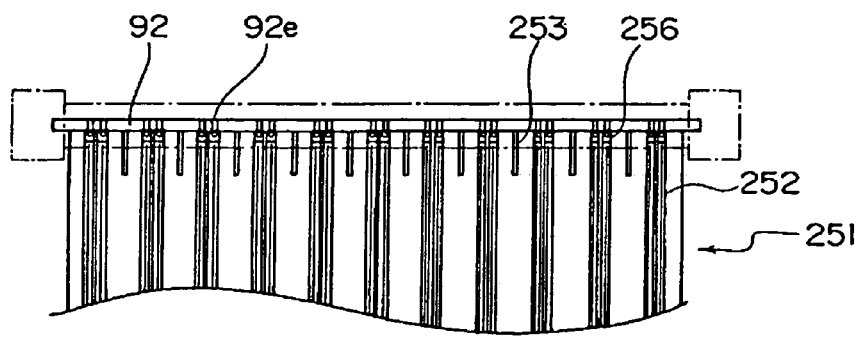
FIG. 1 is a plan view of an electrode extension sheet according to the present invention.
Figure 2:
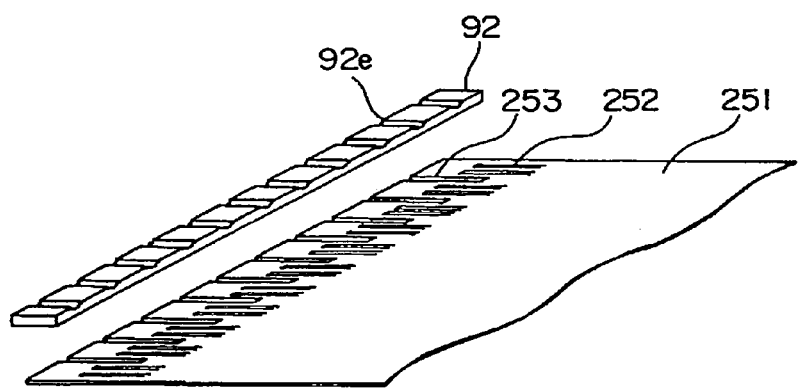
FIG. 2 is a perspective view showing the positional relationship or the like between the electrode extension sheet shown in FIG. 1 and a ceramic bar when the latter is mounted to the former.
Figure 3A:
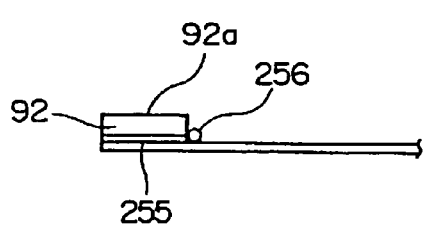
FIG. 3 is a side view showing a state in which the ceramic bar is mounted to the electrode extension sheet shown in FIG. 1.
Figure 3B:
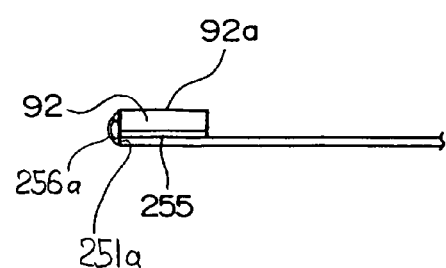

FIG. 1 is a diagram showing an electrode extension sheet 251 according to the present invention as seen from above, FIG. 2 is a perspective view showing the positional relationship when mounting a ceramic bar 92 to the electrode extension sheet 251, and FIGS. 3A and 3B are side views showing states in which the ceramic bar 92 is mounted to the electrode sheet 251. The electrode extension sheet 251 shown in FIG. 1 consists of a flexible and insulating plastic sheet, polyimide sheet or the like, and has on the side to which the ceramic bar 92 is mounted an electric wiring 252 consisting of copper or the like. The electrode extension sheet 251 is divided into a portion supporting the ceramic bar 92 and a portion where the electric wiring is formed.

The surface of the ceramic bar on the opposite side of the lapping surface 92a is secured through an adhesive 255 to an end portion on the electrode extension sheet, that is, a predetermined portion thereof holding the ceramic bar. Further, bump electrodes (See FIG. 4) for measuring lapping amount formed on the ceramic bar 92 are connected to the end portion of the electric wiring 252 by conductive balls 256 consisting of gold or the like. While in the drawing only a part of the wiring 252 is shown, the wiring further extends actually, and is connected at an end portion (not shown) to a device for measuring the characteristics of each element. It may happen, for example, that the bump electrodes become rather small and that the diameter of the conductive balls 256 becomes larger than the distance between the electrodes, making the actual connection impossible. In this case, it is desirable to use a so-called wire bonding, effecting a connection between the bump electrodes and the electric wiring 252 by a conductive wire 256a, as shown in FIG. 3B. In this case, to facilitate the wire bonding, it is desirable to use an electrode extension sheet 251 in which the electric wiring 252 is formed up to the end surface 251a or the vicinity thereof, making the distance between the ends of the bonding as large as possible.

When performing a crown processing, it is necessary for the ceramic bar 92 to be easily bent along the curved surface formed on the lapping surface. Thus, in the ceramic bar 92 shown in FIG. 2, grooves 92e perpendicular to the longitudinal direction are formed between the elements in the pre-process of the crown processing. Thus, in order that the deformation of the ceramic bar may not be influenced by the presence of the electrode extension sheet 251, slits 253 are formed in the electrode extension sheet 251 so as to be parallel to the grooves 92e and at positions corresponding to the respective elements. These slits 253 are not necessary when the electrode extension sheet 251 is only used for a lapping processing to achieve a predetermined throat height value, or when the electrode extension sheet 251 has high deformability and does not restrict the deformation of the ceramic bar 92 in any way.

By attaching the ceramic bar 92 which is mounted to the electrode extension sheet 251 of the present invention to a lapping apparatus and executing the lapping of the ceramic bar 92, it is possible to eliminate the connecting operation which has conventionally been performed between electrodes provided on ceramic bar mounting jigs (horizontal jigs 94 described below) and the elements, etc. on the ceramic bar. Thus, there is no need to prepare a large number of expensive jigs and to perform the connection between the electrodes on these jigs and the electrodes on the ceramic bar, making it possible to substantially reduce the number of jigs. Further, in a lapping operation, etc. using no jigs, for example, crown processing, it is possible to execute a lapping operation in which the jigs which have been needed only for the purpose of leading out the measurement electrodes are eliminated, thereby making it possible to achieve a reduction in the cost of the apparatus and the processing.

Figure 4:
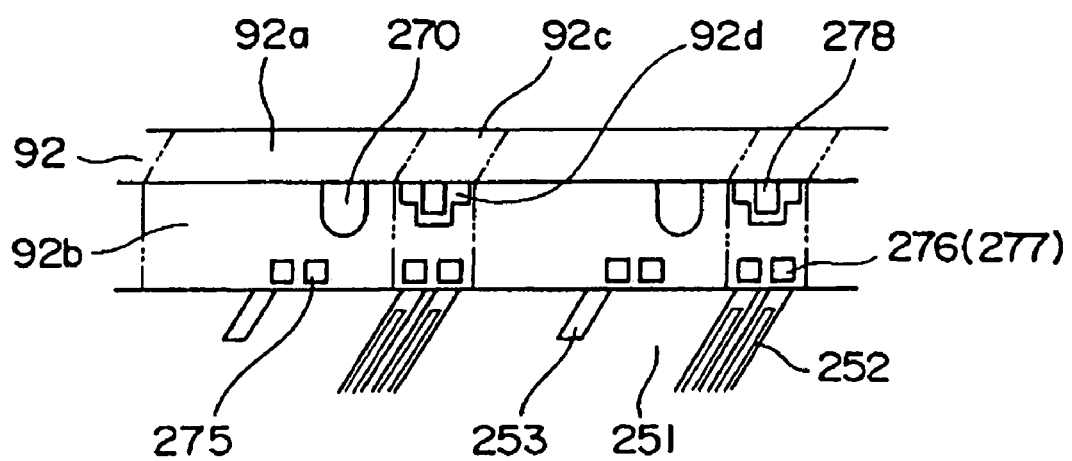
FIG. 4 is a diagram showing the positional relationship of electrodes, etc. in a state in which the ceramic bar is secured to the electrode extension sheet of the present invention.

FIG. 4 shows a state in which the ceramic bar 92 on which element portions 270, additional electrodes 278, and bump electrodes are formed is arranged on the electrode extension sheet 251. In the drawing, the upper surface of the ceramic bar 92 constitutes the lapping surface 92a, and formed on the surface 92b perpendicular to the lapping surface are the element portions 270, the additional electrodes 278, first bump electrodes 275 for mounting used when connecting the element portions 270 to an external circuit (not shown), second bump electrodes 276 for lapping amount measurement, and third bump electrodes 277 for lapping amount measurement used when connecting the additional electrodes 278 to an external circuit (not shown). Actually, on the surface 92b, the element portions 270 are connected to the first bump electrodes 275 and the second bump electrodes 276, and the additional electrodes 278 are connected to the third bump electrodes. Further, the second bump electrodes 276 and the third bump electrodes 277 are formed substantially at the same positions, and alternately used according to the use. In the drawing, to facilitate the understanding, the wiring used for the connection is omitted and the reference numeral 277 indicating the third bump electrodes is given in a parenthesis.

As the ceramic bar 92 is lapped, the element portions 270 and the additional electrodes 278 are partially lapped and undergo changes in their characteristics. For example, as the lapping amount of the additional electrodes 278 increases, that is, as the additional electrodes 278 become smaller, their resistance value increases. By measuring the resistance value, etc. by an external circuit, it is possible to know the lapping amount, etc. further required at the time of measurement. The end portion of the electric wiring 252 on the electrode extension sheet 251 is electrically connected to the second bump electrodes 276 or third bump electrodes 277 by means of the gold balls 256, and the other end of an electric wiring (not shown) to a measurement device to measure the above resistance value, etc.

In this embodiment, after the processing to achieve a predetermined throat height value, the additional electrodes 278 are formed in portions 92c where the grooves 92e are formed in the pre-process of the crown processing, which disappear by the cutting processing for forming the grooves 92e. Thus, at the time of the crown processing, the additional electrodes 278 do not exist, and the measurement of the lapping amount is effected by measuring the variation in the characteristics in the element portions 270. Further, regions 92d in the ceramic bar 92 are portions which disappear when the ceramic bar 92 is cut into a plurality of sliders, and the second bump electrodes 276 and the third bump electrodes 277 for the lapping amount measurement disappear by this cutting. Thus, if the lapping amount is measured by using real elements, the bump electrodes with the gluing traces of the conductive balls 256 used for lapping amount measurement, which are not required in the products, are removed, not remaining on the sliders as the products.

By arranging the connection bumps for lapping amount measurement as described above to effect the connection with the wiring on the electrode extension sheet 251 of this embodiment, it is possible to measure the actual lapping amount or the lapping amount required at the time of measurement without affecting the sliders in any way. Further, by arranging the connection bump electrodes as described above, the bump electrodes and the wiring on the electrode extension sheet can be easily connected together.

In this embodiment, the number, arrangement and configuration of the electric wirings, the number, arrangement and configuration of the slits, etc. are only given by way of example, and should not be construed restrictively. Also regarding the configuration of the sheet, it is not absolutely necessary for its width to be uniform. To facilitate the handling, it is also possible for the width of the portion other than the region retaining the ceramic bar to be gradually reduced. Further, it is also possible to laminate a flexible and insulating sheet, such as a polyimide film, to the upper surface of the portion of the electrode extension sheet where the electric wirings are formed.

Next, a specific example in which the electrode extension sheet of the present invention is used in an actual lapping apparatus will be described. In the following cases described below, the present invention is applied to an apparatus for achieving a predetermined throat height value and an apparatus for performing crown processing. (Processing for Achieving a Predetermined Throat Height Value)

Figure 5:
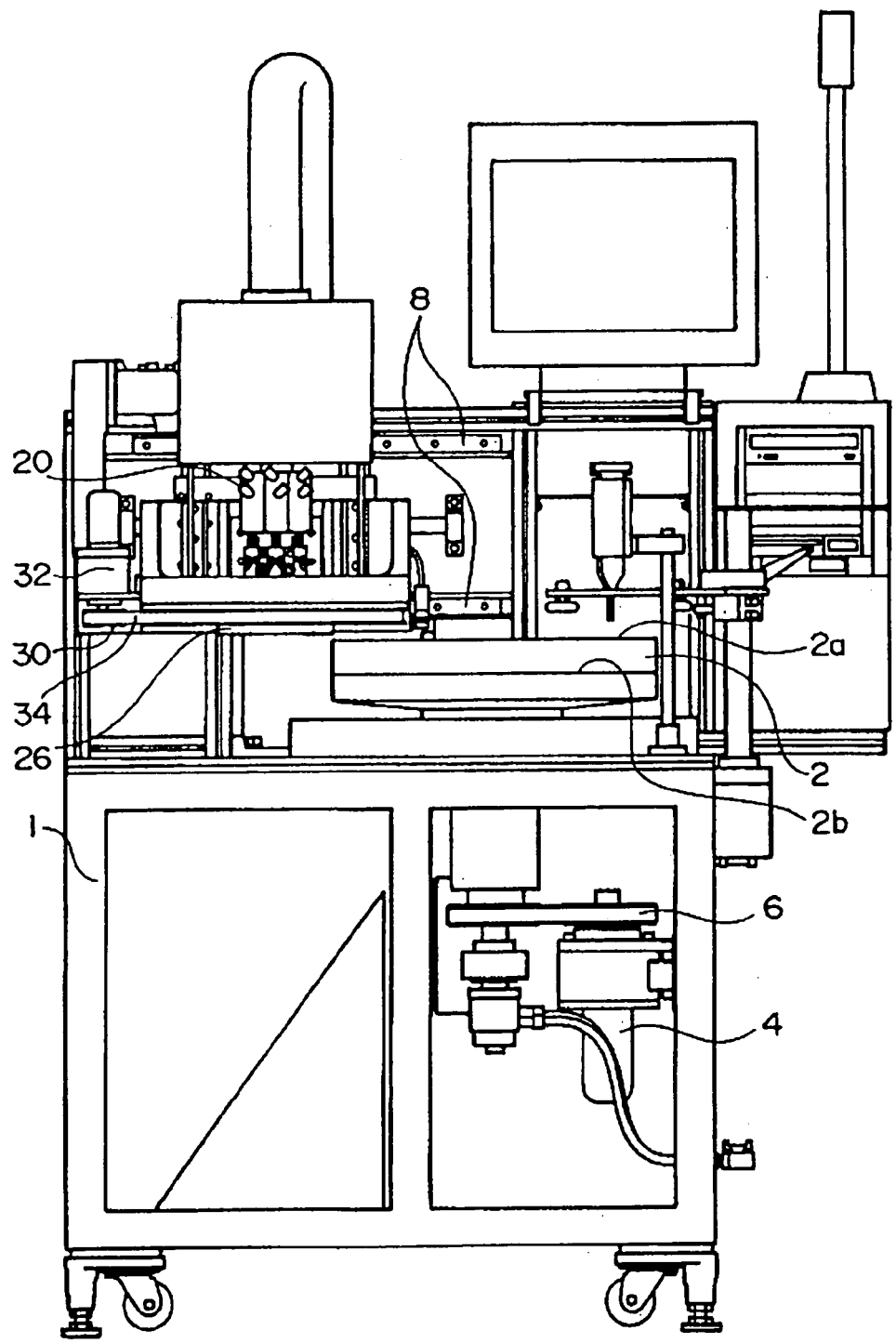
FIG. 5 is a general plan view of a lapping apparatus which is a specific example of an apparatus using the electrode extension sheet of the present invention.
Figure 6:
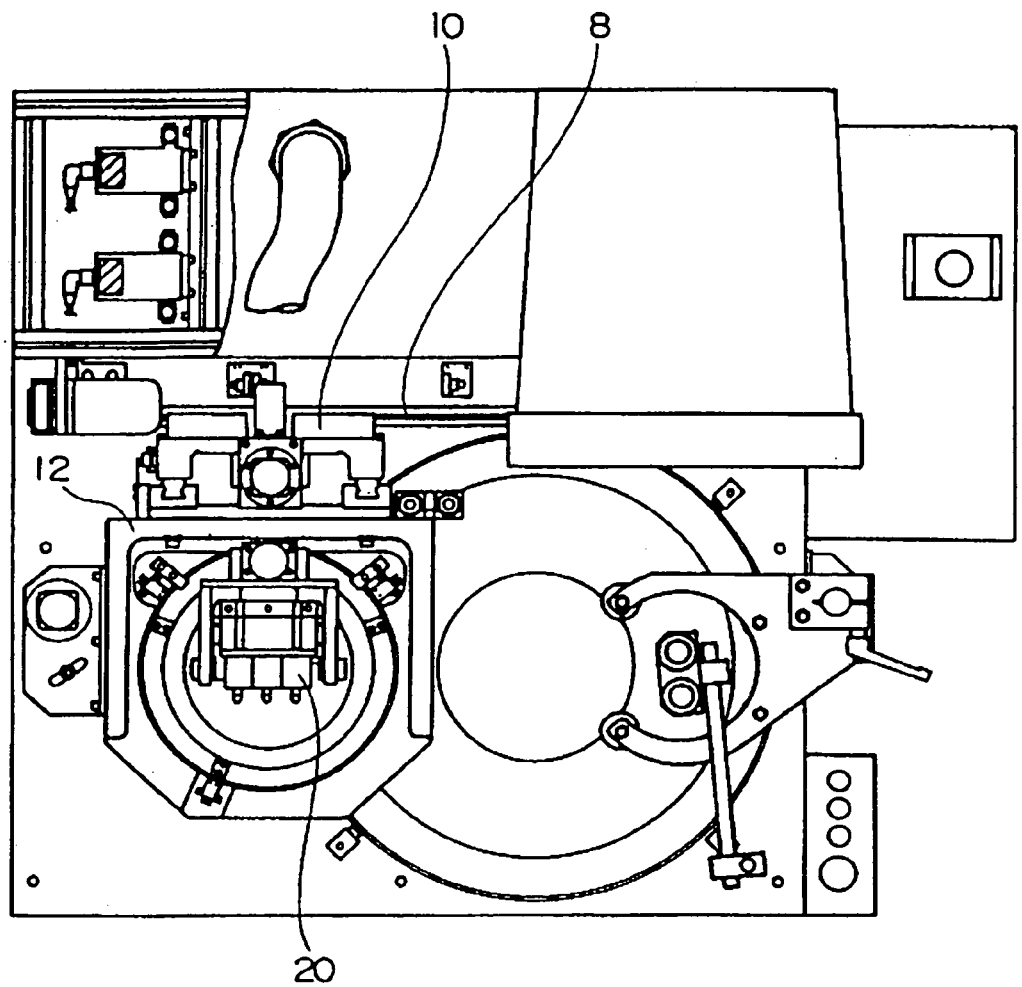
FIG. 6 is a plan view of the lapping apparatus shown in FIG. 5.

In the following, a lapping apparatus for achieving a predetermined throat height value will be described with reference to the accompanying drawings. FIG. 5 is a general front view of the lapping apparatus, and FIG. 6 is a plan view thereof. Referring to FIGS. 5 and 6, the general construction of the magnetic head lapping apparatus will be described. The magnetic head lapping apparatus is equipped with a base 1, on which a lapping disc 2 is supported so as to be rotatable in a horizontal plane. Further, this lapping disc 2 is rotated by a disc driving motor 4 serving as a rotation drive source provided in the base 1 through a belt 6.

Further, a pair of guide rails 8 vertically spaced apart from each other are supported above the base 1 so as to horizontally extend. Further, there is provided a lateral movement slider 10 which is guided by the pair of guide rails 8 so as to be slidable in the horizontal direction. A lapping head mounting frame 12 is mounted to the lateral movement slider 10 so as to be capable of ascending and descending (It is driven vertically so as to allow height adjustment). The driving of the lateral movement slider 10 can be executed, for example, by threadedly engaging a ball screw nut on the slider 10 side with a ball screw shaft parallel to the guide rails 8, and rotating the ball screw shaft by a motor. Further, the slider 10 and the lapping head mounting frame 12 are capable of reciprocal linear movement.

Figure 7:
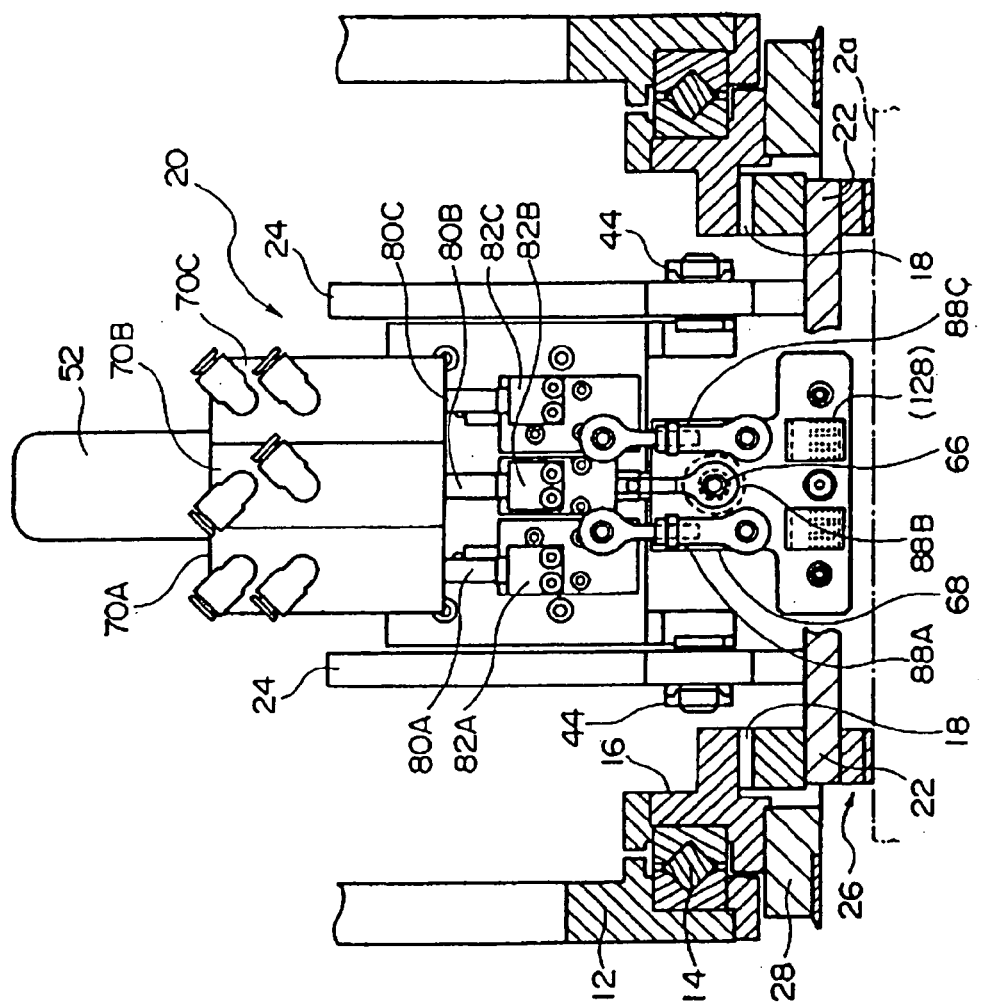
FIG. 7 is a front view of a lapping head, etc. in the lapping apparatus shown in FIG. 5.
Figure 8:
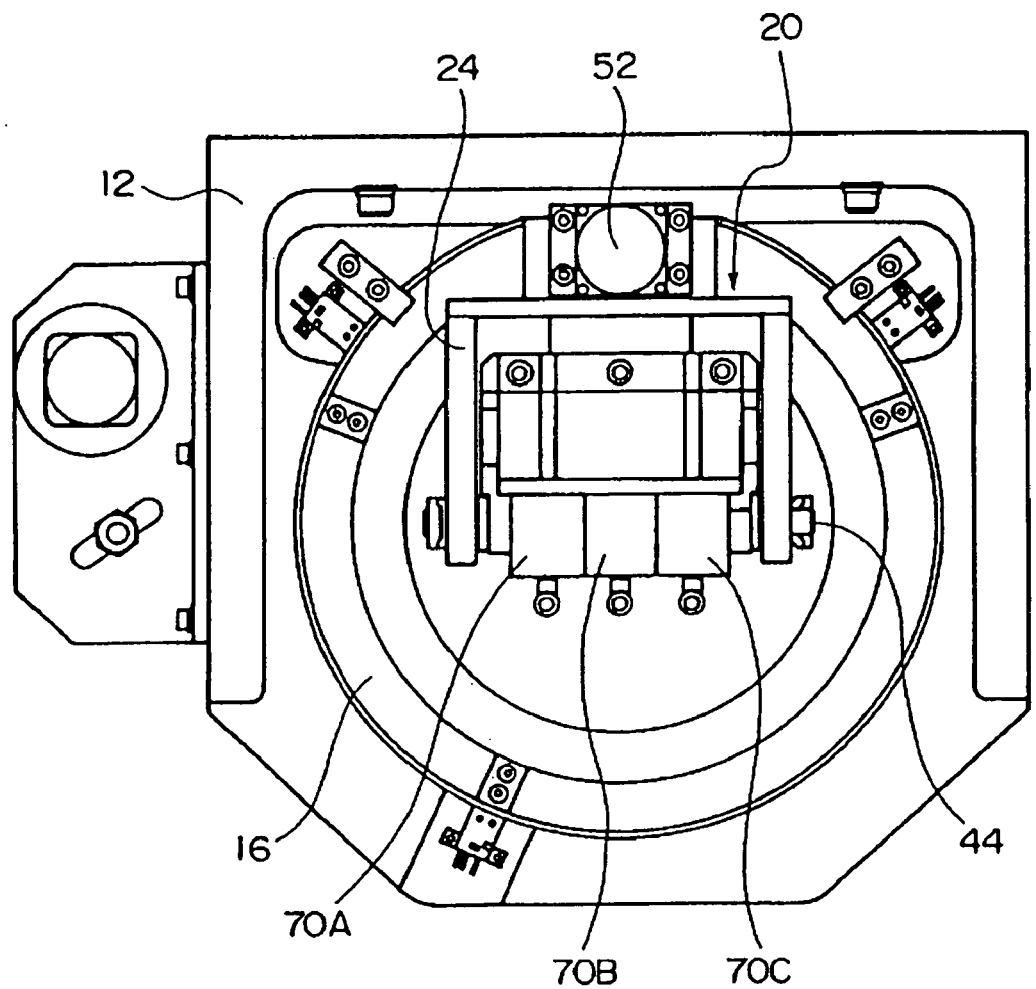
FIG. 8 is a plan view of a lapping head, etc. in the lapping apparatus shown in FIG. 5.

As shown in FIG. 7, on the inner side of the lapping head mounting frame 12, a rotary support portion 16 is rotatably supported through the intermediation of an annular bearing portion 14, and a lapping head 20 is mounted to the rotary support portion 16 through the intermediation of a connecting member 18. The lapping head 20 includes a bottom plate 22 and vertical support plates 24 provided thereon so as to extend vertically in parallel to each other. Further, an adjust ring (wear pad) 26 is secured to the bottom surface of the bottom plate 22 of the lapping head 20. The adjust ring 26 is in contact with a lapping surface 2*a*, which is the upper surface of the lapping disc 2, and serves to stabilize the attitude of the lapping head 20 with respect to the lapping surface 2*a*.

As shown in FIGS. 5 and 7, a belt wheel (pulley) 28 is secured to the rotary support portion 16, and mounted to the outer side of the lapping head mounting frame 12 is a lapping head swinging motor 32 for rotating a belt wheel (pulley) 30. A belt 34 is looped between the belt wheels 28 and 30. The motor 32, the belt wheels 28 and 30, and the belt 34 function as a swinging means for causing the lapping head 20 and the adjust ring 26 to make a reciprocal rotary movement (swinging movement) within a predetermined angle range.

As shown in FIGS. 7 through 10, between the vertical support plates 24 of the lapping head 20, there is provided a tilting shaft 44 which is parallel to the lower surface of the lapping disc 2, and a tilting portion 46 is rotatably mounted so as to be capable of tilting with respect to the lapping head 20 around the tilting shaft 44.

Figure 9:
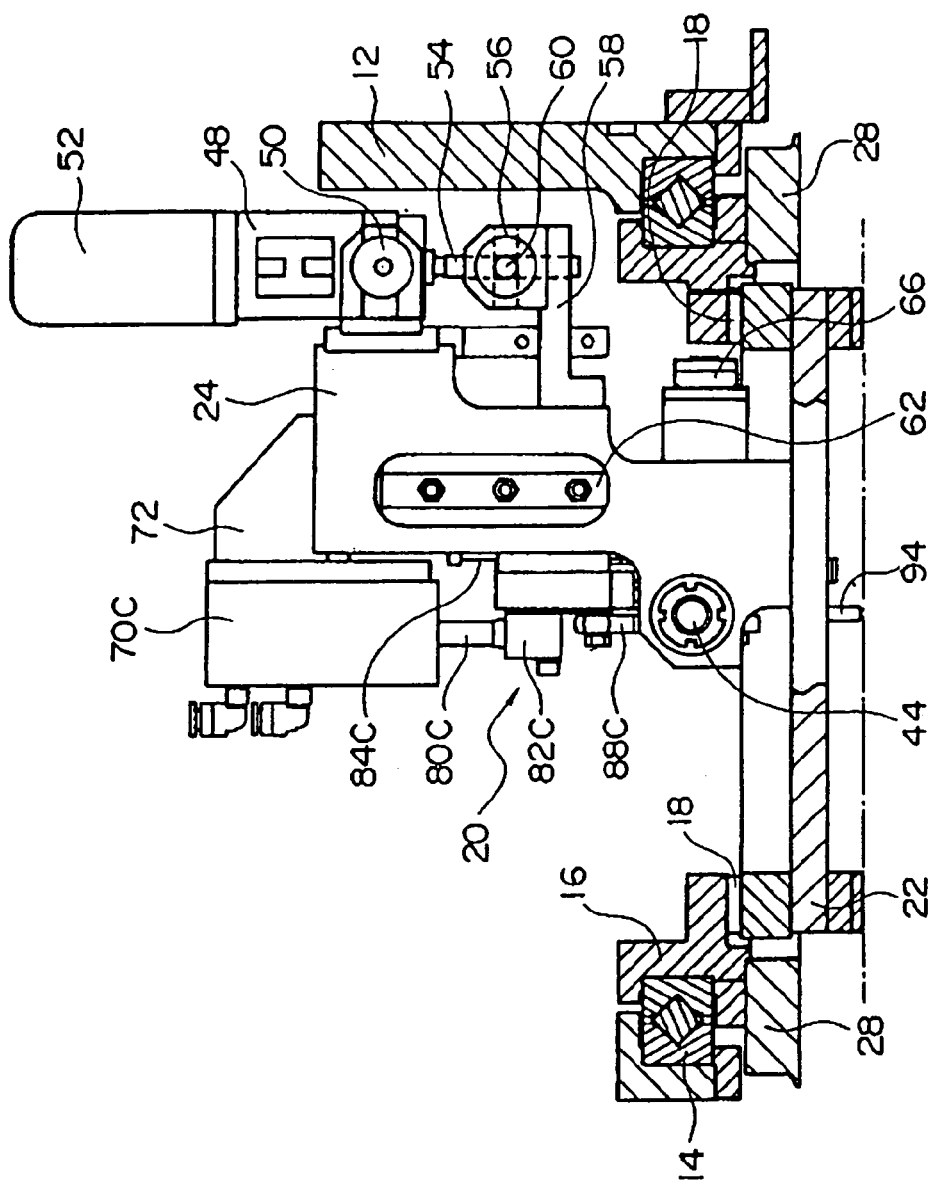
FIG. 9 is a side view of a lapping head, etc. in the lapping apparatus shown in FIG. 5.
Figure 10:
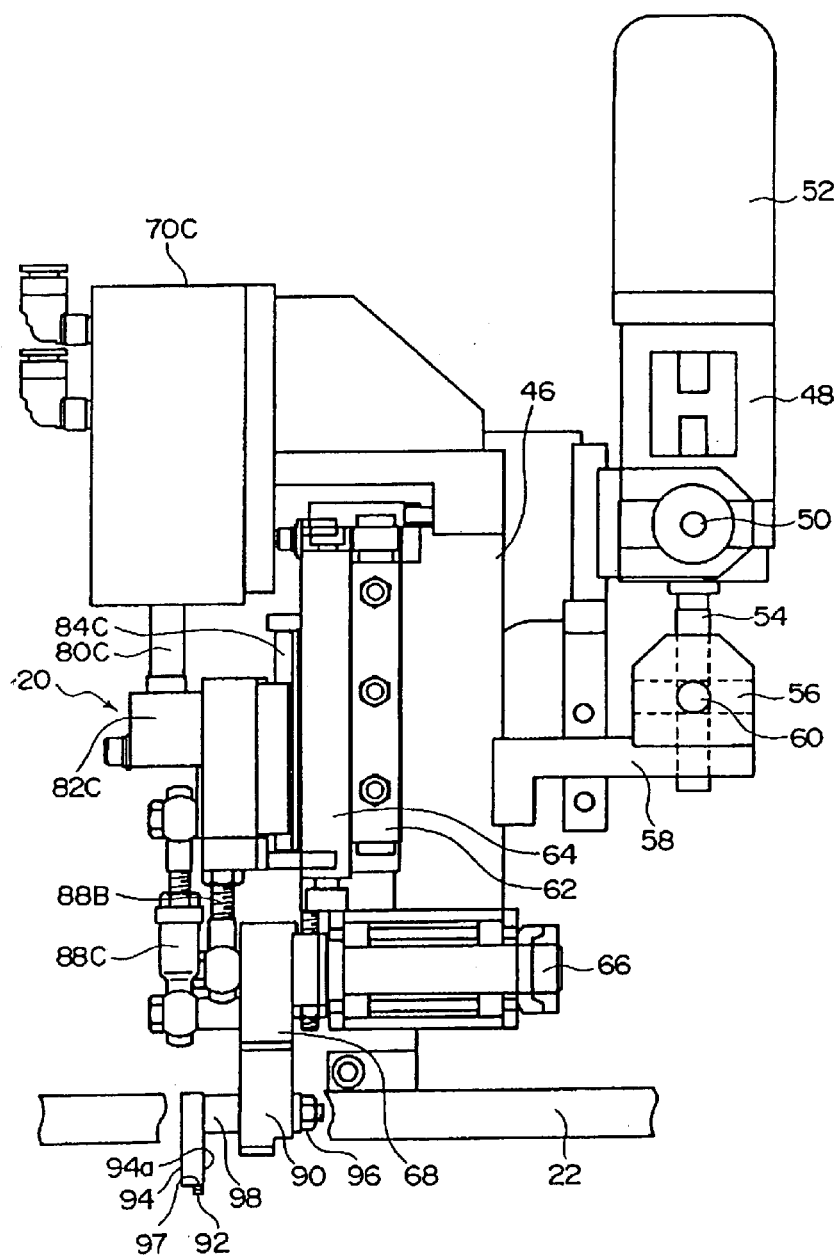
FIG. 10 is an enlarged side view of a lapping head, etc. in the lapping apparatus shown in FIG. 5.

As shown in FIGS. 9 and 10, the lower portion of a motor mounting pedestal portion 48 is rotatably mounted to the vertical support plates 24 of the lapping head 20 by a fulcrum shaft 50. Further, a tilting motor 52 is secured to the upper portion of the motor mounting pedestal portion 48. A ball screw shaft 54 is connected to the rotating shaft of the motor 52, and a ball screw nut 56 is threadedly engaged with the ball screw shaft 54. Connected to the ball screw nut 56 at a fulcrum shaft 60 is the other end of an arm 58 whose one end is secured to the tilting portion 46. The mechanism from the fulcrum shaft 50 to the fulcrum shaft 60 constitutes a tilting drive means for tilting the tilting portion 46 by a predetermined angle from the state in which it constitutes a vertical surface with respect to the lapping surface 2*a* of the lapping disc 2.

An ascent/descent portion 64 is mounted to the tilting portion 46 through the intermediation of a slide bearing (cross roller guide) 62 so as to be capable of ascending and descending with respect to the tilting portion 46. Here, the movement of the ascent/descent portion 64 in the inclining direction is effected integrally with the tilting portion 46, so that the tilting portion 46 and the ascent/descent portion 64 are constantly kept parallel to each other. A back plate 68 is rotatably mounted to the lower end portion of the ascent/descent portion 64 by means of a fulcrum shaft 66 which is parallel to the lower surface of the lapping disc 2 and perpendicular to the tilting shaft 44.

As shown in FIGS. 7 and 9, above the tilting portion 46, there are mounted actuators 70A, 70B, and 70C through the intermediation of a bracket 72. These actuators 70A, 70B, and 70C serve to push (push or pressurize) or pull up (draw up) the fulcrum shaft 66 of the back plate 68 and the right and left sides thereof in a direction perpendicular to the lapping surface 2*a*, and to control the load applied to the back plate 68. In this specification, the application of force to the back plate 68 by the actuators is simply referred to as pressurization.

Cylinder joints 82A, 82B, and 82C composed of screws, nuts, spherical members, etc. are connected to the lower ends of the rods 80A, 80B, and 80C of the actuators 70A, 70B, and 70C so as to be capable of ascending and descending along slide bearings 84A, 84B, and 84C mounted to the ascent/descent portion 64. The lower ends of these cylinder joints 82A, 82B, and 82C are connected to the center and the right and left sides of the back plate 68 by connection links 88A, 88B, and 88C. Thus, as shown in the drawings, the directions of the pressurizing forces applied to the back plate 68 by the actuators 70A, 70B, and 70C are parallel to each other.

When actually performing lapping, the pressing or pulling-up load (hereinafter referred to as pressurizing force) applied to the lapping surface 2*a* by the ceramic bar 92 is adjusted by the actuator 70B, and adjustment of the balance of the longitudinal pressurizing force of the ceramic bar 92 is roughly effected by the other actuators 70A and 70B. Thus, in some cases, the pressurizing force of the actuators 70A, 70B, and 70C is partially applied as a draw-up force according to the variation in the lapped portion and the lapping amount in the longitudinal direction of the ceramic bar 92.

Figure 11:
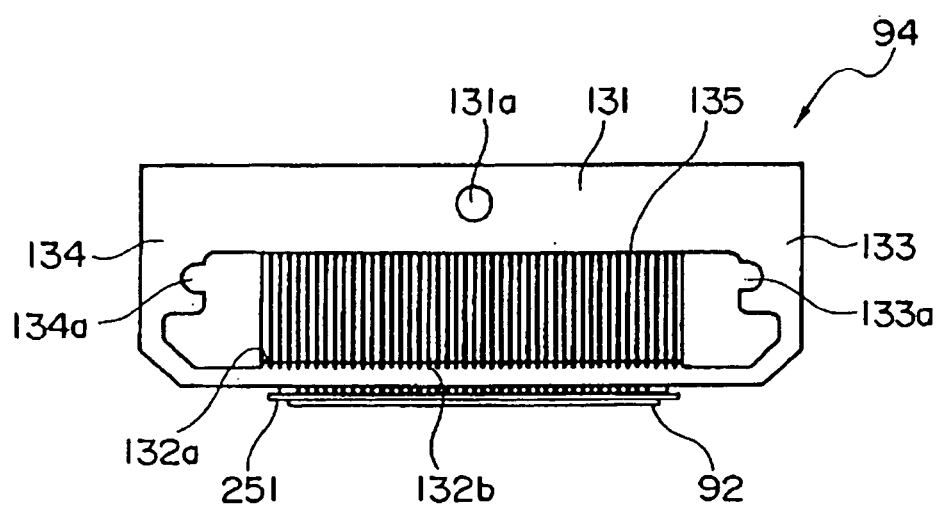
FIG. 11 is a front view showing a jig used in the lapping apparatus shown in FIG. 5 and a state in which the electrode extension sheet of the present invention is fastened to the jig.

The back plate 68 is connected to a horizontal jig 94 through a rectangular plate-like portion 90, a support pin 96, positioning pins 97A and 97B, and a connecting member 122. FIG. 11 is a front view showing the horizontal jig 94, and the ceramic bar 92 and the electrode extension sheet 251 secured thereto. The horizontal jig 94 is formed by an integral unit composed of a main body portion 131, a retaining portion 132, connecting portions 133 and 134, and a plurality of micro actuators 135 whose both ends are secured to the main body portion 131 and the retaining portion 132. In the retaining portion 132, groove portions 132*b* are formed between securing portions 132*a* to which the micro actuators 135 are secured, making it possible to easily effect the different deformation for each portion pressurized by adjacent micro actuators. The micro actuators 135 are arranged in correspondence with the sliders obtained from the ceramic bar by cutting.

At the central portion with respect to the length direction of the main body portion 131, there is formed a through-hole 131*a* extending from the front to the back side of the jig, and the support pin 96 passing through the through-hole 131*a* is fastened to the connecting member 122 by a screw, nut, etc.

(not shown), whereby the horizontal jig 94 is secured to the back plate 68. Further, in the connecting portions 133 and 134, the positioning pins 97A and 97B fitted into recesses 133a and 134a formed to be parallel to the through-hole 131a are, like the support pin 96, secured to the connecting member 98, whereby the horizontal jig 94 can be secured to a predetermined position with respect to the back plate 68.

When performing lapping, it is necessary to obtain the requisite driving amount of each micro actuator 135, that is, the lapping amount, at the time of lapping or prior to that, and it is desirable to perform lapping by a so-called closed loop control and control the lapping amount of the ceramic bar 92. In the prior-art technique, electrodes and additional electrodes formed on the back plate side surface 94a of the horizontal jig 94 are electrically connected by wire bonding, and when securing the horizontal jig 94 to the rectangular plate-like portion 90, measurement pins 128 biased by springs or the like embedded in the rectangular plate-like portion 90 (See FIG. 7) are brought into contact with these electrodes, and further, the measurement pins 128 are connected to a resistance value measuring means (not shown), thereby making it possible to measure the variation in the characteristics of the additional electrodes.

In this embodiment, as shown in FIG. 11, at the position on the horizontal jig 94 where the ceramic bar is usually secured, the electrode extension sheet 251 to which the ceramic bar 92 is attached is secured, and the element portions 270 or the additional electrodes 278 on the ceramic bar 92 are connected to a means for measuring characteristics, such as resistance values, through the electric wirings 252. The resistance values, etc. of the additional electrodes 278 can be measured by various well-known methods, such as the four-terminal method. A description of the measurement method, which is not directly related to the present invention, will be omitted.

As described above, through the implementation of to the present invention, in the processing for achieving a predetermined throat height value and in a lapping apparatus used for the processing, it is possible to control the lapping amount through the closed loop without directly effecting the electrical connection on the expensive jig, such as the horizontal jig described above, with the bumps of the real elements or the additional electrodes. While a lapping apparatus for achieving a predetermined throat height value has been described as a specific example of the lapping apparatus using a jig for retaining a ceramic bar, which employs the present invention, the present invention is not restricted to such an apparatus. It is also possible to apply the present invention to an apparatus and a method using a jig for crown processing as disclosed, for example, in Japanese Patent Application No. 11-302305.

(Crown Processing)

Next, a lapping apparatus used for crown processing will be described with reference to the accompanying drawings. This lapping apparatus is distinguished from the above-described lapping apparatus for achieving a predetermined throat height value only by the construction of the lapping head 20 secured to the lapping head mounting frame 12 and by the fact that the lapping surface 2a is formed as a conical shape composed of a substantially concave surface constituting a part of a spherical surface having a predetermined radius. Thus, in the following, only the construction of the lapping head will be described. In the following, a detailed description will be given with reference to FIG. 12, which is a side view of a lapping head, etc., FIG. 13, which is a plan view of the lapping head, etc. excluding an electropneumatic regulator, etc. and FIG. 14, which is a front view of the lapping head.

Figure 12:
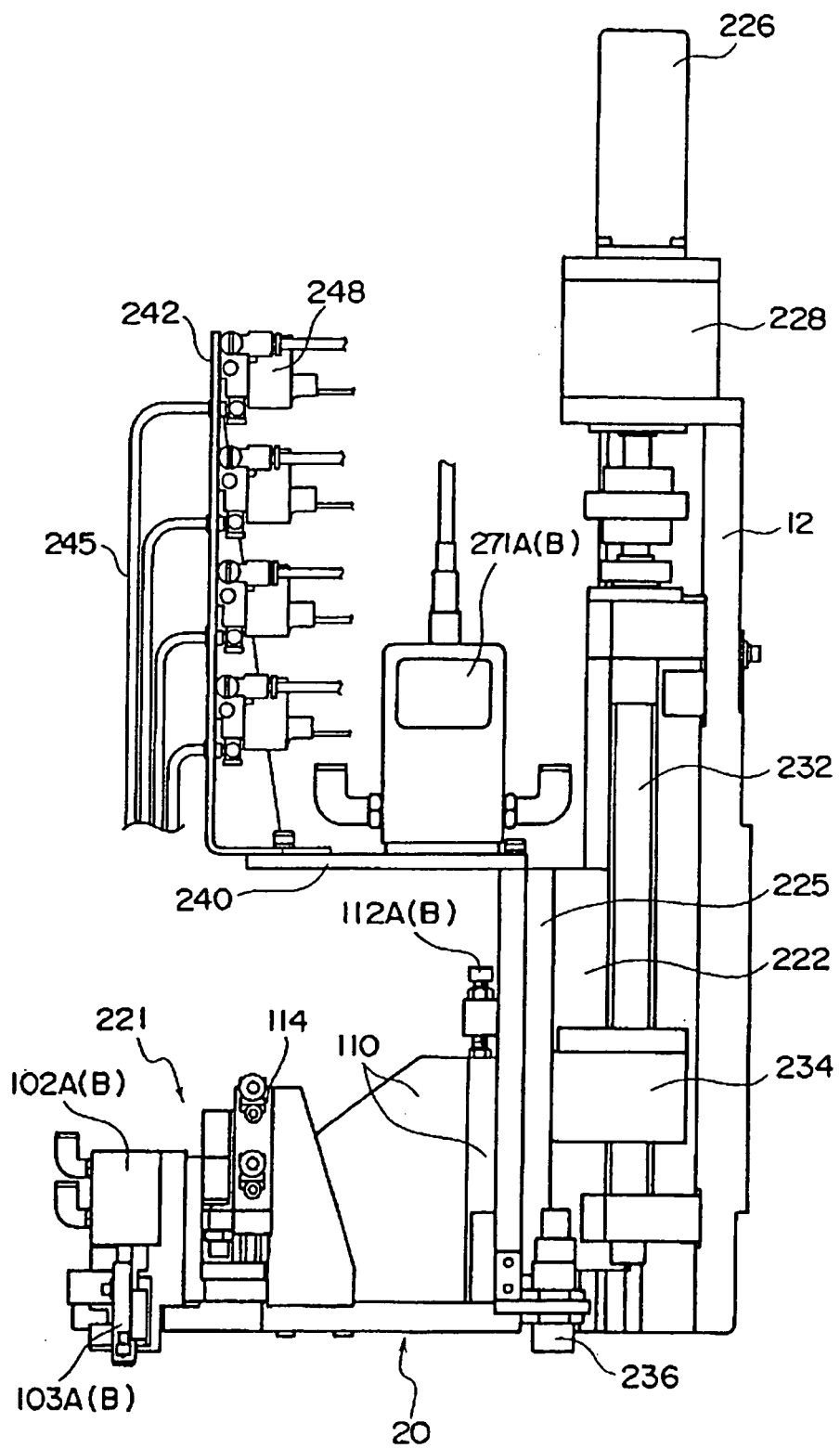
FIG. 12 is a side view of a lapping head, etc. in another lapping apparatus which is a specific example of an apparatus using the electrode extension sheet of the present invention.

As shown in FIG. 12, a connection plate 225 is mounted to the lapping head mounting frame 12 through the intermediation of a Z-axis slider 222, and the plate 225 is driven in the Z-axis direction (in a direction substantially perpendicular to the lapping surface) by a Z-axis motor 226 and a reduction gear 228 secured to the lapping head mounting frame 12 through a ball screw 232 and a ball screw nut 234. The plate 225 constitutes an ascent/descent portion. The plate 225 descends relative to the lapping surface, and the lower end of its movement is detected by a photo sensor 236 which is a proximity switch. Attached to the plate 225 are an electropneumatic regulator securing portion 240 to which an electropneumatic regulator 271 for balancing and a valve bracket 242 are secured, and the lapping head 20 actually driven by the electropneumatic regulator 248. To simplify the drawing, an air piping 245 extending from the valve bracket 242, etc. are omitted.

Figure 13:
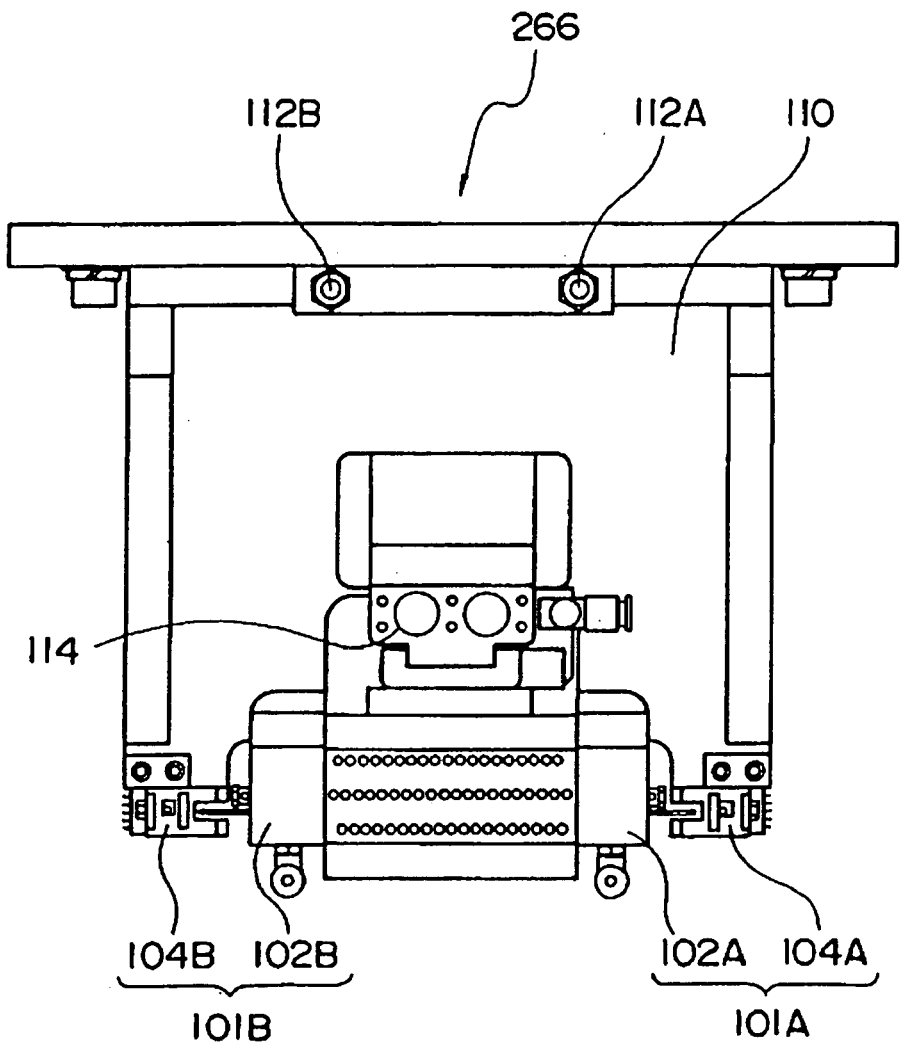
FIG. 13 is a plan view of the lapping head, etc. shown in FIG. 12.
Figure 14:
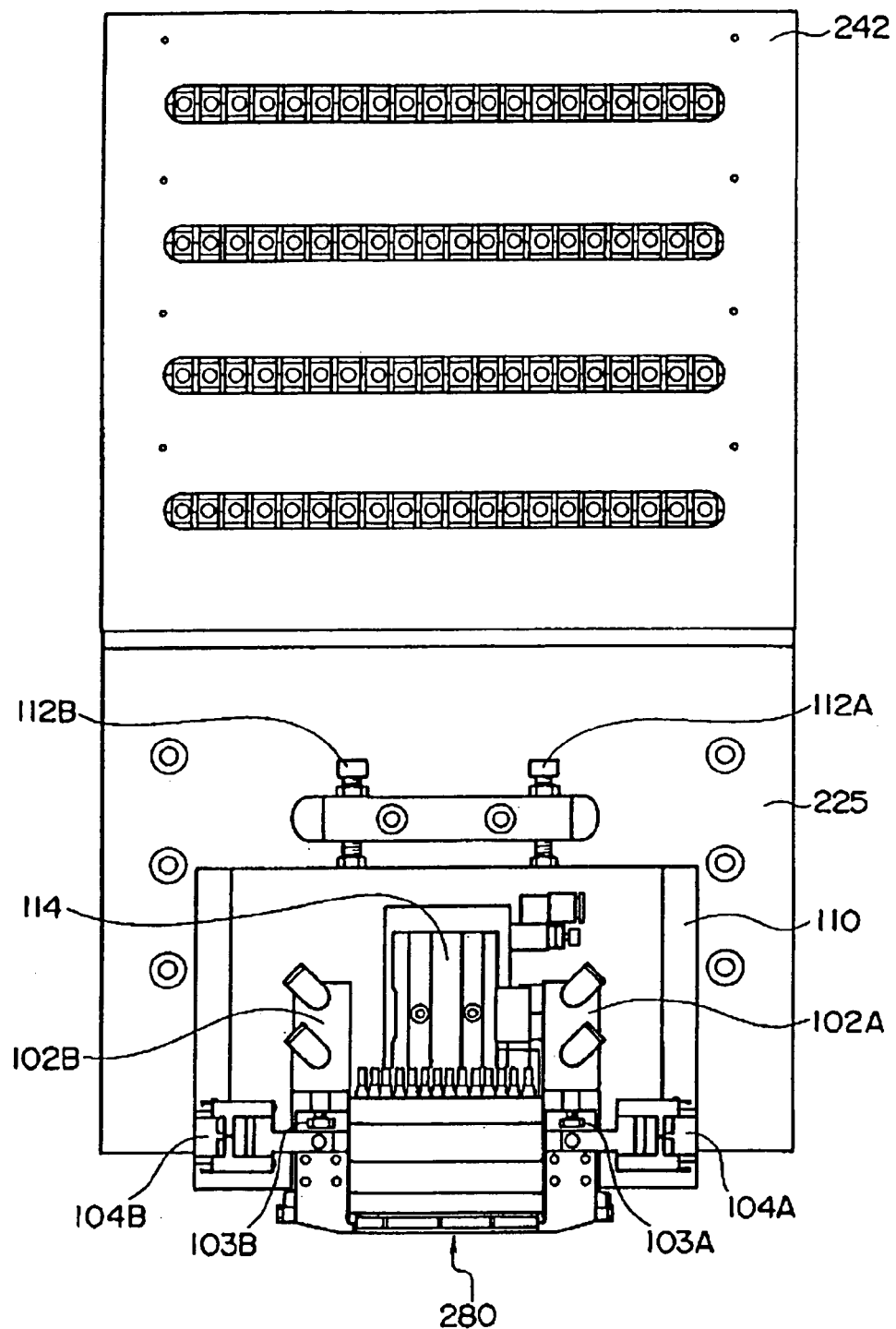
FIG. 14 is a front view of the lapping head, etc. shown in FIG. 12.

As shown in FIGS. 12 through 14, the lapping head 20 is supported by a head holder 110 which is rotatable around a fulcrum shaft 266 with respect to the connection plate 225. The amount by which the head holder 110 rotates around the fulcrum shaft 266 is adjusted by adjustment screws 112A and 112B. The head holder 110 supports a pressurizing mechanism 280 through the intermediation of a cylinder 114 with a linear guide, and enables the pressurizing mechanism 280 to be vertically driven relative to the lapping surface 2a. Further, the head holder 110 supports on both sides thereof ceramic bar retaining units 101A and 101B, retaining the right and left end portions of the ceramic bar 92, independently of the pressurizing mechanism 280.

A head portion 221 is formed by the pressurizing mechanism 280 and the retaining units 101A and 101B. The retaining units 101A and 101B are respectively composed of cylinders 102A and 102B secured to the head holder 110, sliders 103A and 103B respectively driven by the cylinders 102A and 102B, and sensors 104A and 104B for respectively measuring the driving amounts of the sliders 103A and 103B. The retaining units 101A and 101B support both the end portions of the ceramic bar 92 independently of the pressurizing mechanism 280. Further, by vertically driving these sliders, it is possible to prevent an excessive load from being applied when the ceramic bar 94 is pressed against the lapping surface 2a.

Figure 15:
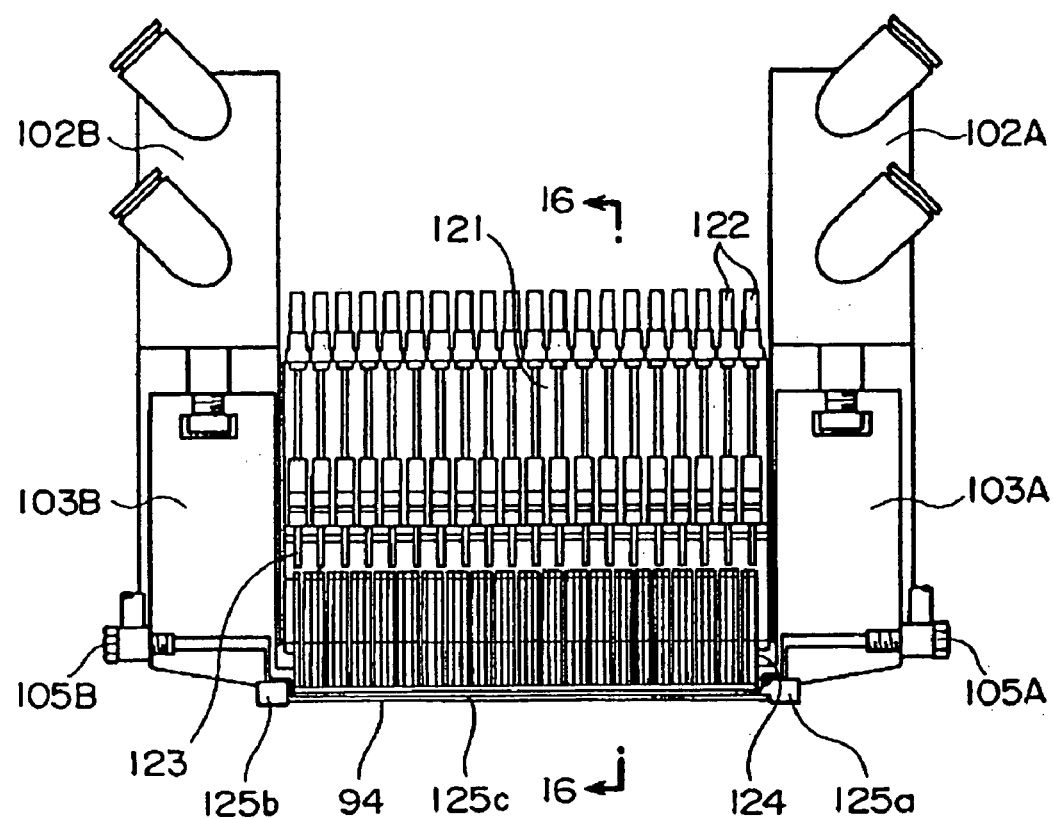
FIG. 15 is a front view, seen from the direction of the arrow, showing a pressing mechanism in the lapping head shown in FIG. 12 and a state in which the electrode extension sheet of the present invention is fastened to the mechanism.
Figure 16:
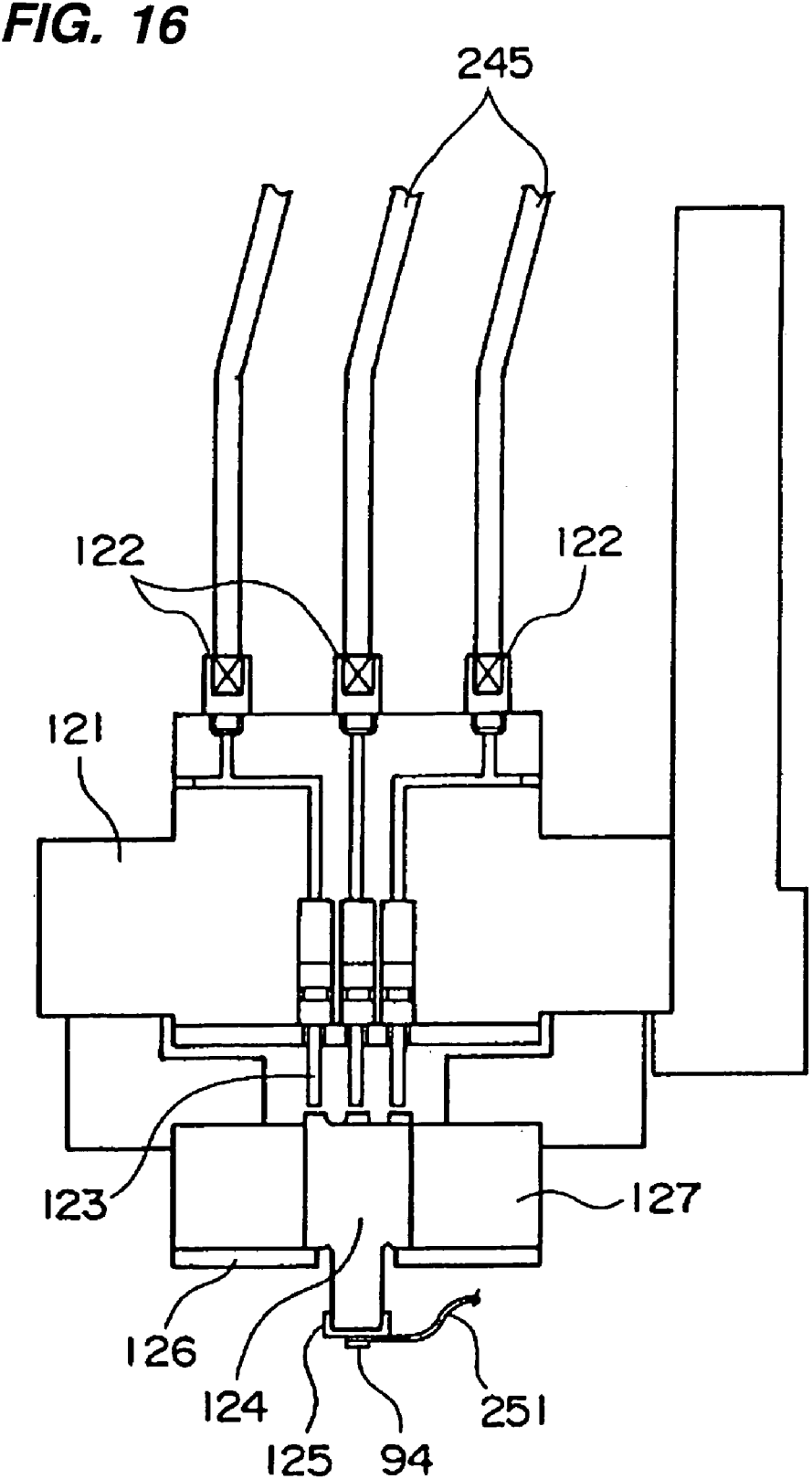
FIG. 16 is a sectional view taken along the line 16—16 of the pressing mechanism shown in FIG. 15.

Next, the pressurizing mechanism 280 will be described in detail with reference to FIGS. 15 and 16. FIG. 15 is a front view of the pressurizing mechanism 280 as seen from the direction of the arrow, and FIG. 16 is a sectional view taken along the line 16—16 of FIG. 15. In the pressurizing mechanism 280, air supplied from an electropneumatic regulator 248 is introduced into manifold cylinders 121 through joints 122, and pistons 123 retained in the manifold cylinders 121 and serving as actuators are driven. In response to the driving of the pistons 123, sliders 124 are driven substantially vertically with respect to the lapping surface 2a. The driving range for the sliders is restricted by a stopper 126 and a guide 127.

Vacuum attraction ports 105A and 105B are respectively provided at the lower ends of the retaining units 101A and 101B. Rubber sacks 125 covering the sliders from the lapping surface 2a side are secured by an adhesive or the like to the lower ends of all the plurality of sliders 124 arranged side by side. The surfaces of the rubber sacks 125 (the surfaces directed downward in FIG. 15) retain the ceramic bar 92 to be lapped and the electrode extension sheet 251 connected to the ceramic bar 92 from the back side of the electrode extension sheet 251 due to a self-adhesive effect or a kind of vacuum attraction effect.

In this embodiment, the rubber sack 125 consists of attracting portions 125*a* and 125*b* which are secured by attraction at predetermined positions by the vacuum attraction ports 105A and 105B and which support the right and left end portions of the ceramic bar 92 by attraction ports (not shown) respectively communicating with the above-mentioned vacuum attraction ports, and a sack portion 125*c* retaining the back side of the element portion forming portion (not shown) of the ceramic bar 92. Further, while in this embodiment the rubber sack 125 consists of three portions, it is also possible to further separate it according to the rigidity of the material, the attraction capacity of the ceramic bar, etc. In particular, it is possible for the sack portion 125*c* to be formed as separate members respectively corresponding to the sliders 124.

As stated above, the ceramic bar 92 and the electrode extension sheet 251 are retained on the surface of the rubber sack 125, and pressed against the lapping surface 2*a* to perform the crown processing. At the time of processing, the plurality of sliders 124 are respectively driven to deform the rubber sack 125 to thereby deform a specific portion of the ceramic bar 92. Alternatively, by firmly pressing a specific portion of the ceramic bar 92 against the lapping surface 2*a*, it is possible to increase the lapping amount of the specific portion of the ceramic bar 92. The driving amount of the sliders 124, which deform the ceramic bar 94 through the rubber sack 125, which is an elastic member, is damped to some degree by the respective elastic deformations of the rubber sack 125 and the electrode extension sheet 251. Thus, the driving amount of the sliders 124, that is the driving amount of the pistons 123, must be determined taking this damping amount into consideration.

In the above-described lapping apparatus, the deformation by the sliders 124 is effected for each element formed in the ceramic bar. However, under present circumstances, the size of the pistons 123 capable of providing the requisite driving amount of the sliders 124, in particular, the diameter of the pistons 123, is considerably large as compared with the size of the region on the ceramic bar allocated to each element. Thus, as shown in, FIG. 16, the pistons 123 are arranged in three rows, and the pistons 123 driving the adjacent sliders 124 are sequentially arranged in different rows, whereby a different piston 123 is opposed to each slider 124.

In actual lapping, the ceramic bar 92 is pressed against the lapping surface 2*a* having a substantially concave conical configuration, so that it is necessary for the ceramic bar 92 to be held in a state in which it is somewhat inclined toward the spherical surface center of the lapping surface 2*a* so as to extend along the lapping surface 2*a*. In this lapping apparatus, this is realized by rotating the head holder 110 by adjusting screws 112A and 112B. It is necessary for the ceramic bar 92 and the electrode sheet 251 to deflect in correspondence with the concave surface of the lapping surface 2*a* when the ceramic bar 92 is pressed against the lapping surface 2*a*. In this embodiment, this deflection is facilitated by the grooves 92*e* formed perpendicular to the length direction of the ceramic bar 92 and the slits 253 provided in the electrode extension sheet 251.

As stated above, through the application of the present invention, in the crown processing and in a lapping apparatus used for crown processing, it is possible to control the lapping amount through a closed loop without directly effecting the electrical connection from the bumps of the real elements or additional electrodes to an expensive jig. While a specific example of a lapping apparatus for crown processing has been described as an example of an apparatus using no jig for retaining a ceramic bar, the present invention is not restricted to the above apparatus. The present invention is also applicable to an apparatus and a method for achieving a predetermined throat height value without using any jig.

Further, while the present invention has been described solely as applied to lapping, it will be obvious to those skilled in the art that the present invention is applicable not only to lapping but also to grinding, polishing, etc. Further, it will be obvious to those skilled in the art that the present invention is not restricted to the above-described embodiments but that various modifications and alterations are possible without departing from the scope of the claims.

INDUSTRIAL APPLICABILITY

In accordance with the present invention, when performing a processing to achieve a desired throat height value or crown processing or the like for controlling lapping amount through a closed loop or the like, it is possible to easily connect additional electrodes, etc. to lead electrodes. Further, in accordance with the present invention, lead electrodes can be easily connected to additional electrodes, etc. without using any jig as in the prior art. By eliminating the jig and the connection process for the jig, it is possible to reduce the requisite cost for lapping.

The invention claimed is:

1. A lapping method for performing lapping on an object to be lapped which is elongated in one direction, in which a plurality of elements consisting of at least one of electro-magnetic conversion elements and magneto-electric conversion elements are formed in the length direction, or in which a plurality of said elements and additional electrodes whose characteristic vary according to the lapped amount are formed in the length direction, the method comprising:
   providing first and second bump electrodes for said elements respectively, and providing third bump electrodes for said additional electrodes, in the providing processes which the second and third bump electrodes are formed on a portion to be disappeared when the object to be lapped is cut and separated;
   connecting at least one of the second and third bump electrodes electrically to wirings formed on a flexible sheet;
   measuring a signal regarding the lapping amount obtained from at least one of the second and third bump electrodes through the wirings, and calculating the lapping amount based on the measurement result; and
   lapping the object to be lapped in accordance with the lapping amount calculated.

* * * * *